Patented Apr. 22, 1952

2,593,860

UNITED STATES PATENT OFFICE 2,593,860

PREPARATION OF α-AMINO-α,α-DIPHENYL-ACETIC ACID

Robert Duschinsky, Essex Fells, N. J., assignor to Hoffmann-La Roche Inc., Roche Park, Nutley, N. J., a corporation of New Jersey No Drawing. Application November 17, 1949, Serial No. 128,007

1 Claim. (Cl. 260—518)

The present invention relates to a new method for preparing α-amino-α,α-diphenylacetic acid.

According to my invention, I have found that 5,5-diphenyl-hydantoin can be hydrolyzed with an alkaline or acid hydrolyzing agent in aqueous solution at a temperature of about 150–210° C. to produce α-amino-α,α-diphenylacetic acid, a preferred range being about 170–180° C. It is advantageous to carry out the hydrolysis in an inert atmosphere, such as hydrogen or nitrogen. The yields of the desired acid have been found to be larger when the hydrolysis is carried out under alkaline conditions than under acid conditions.

The usual acid and alkaline hydrolyzing agents may be employed for carrying out the reaction, for example, alkali metal and alkaline earth metal hydroxides, as sodium hydroxide, potassium hydroxide, barium hydroxide, and the like; and acids, as hydrochloric acid, hydrobromic acid, sulfuric acid, and the like.

The following examples will serve to illustrate the invention.

Example 1

A mixture of 80 grams of 5,5-diphenyl-hydantoin and 1400 cc. of 20 percent sodium hydroxide was heated in a stainless steel shaking autoclave under a hydrogen atmosphere at 170–180° C. for 24 hours. The reaction mixture was dissolved in 2 liters of water, the solution was clarified by filtering through charcoal and acidified with 400 cc. of glacial acetic acid, whereupon α-amino-α,α-diphenylacetic acid crystallized. It was filtered and washed with water, then with alcohol and finally with ether. Yield: 59 grams (82 percent), M. P. 244–245° C. When the hydrolysis with 20 percent sodium hydroxide was carried out in the same manner at 160° C., the yield was 48 percent; and at 200° C., the yield was 35 percent of α-amino-α,α-diphenylacetic acid. When 30 grams of 5,5-diphenyl-hydantoin and 300 cc. of 10 percent sodium hydroxide were hydrolyzed in an autoclave at 180° C. for 24 hours, the yield of α-amino-α,α-diphenylacetic acid was about 52 percent.

Example 2

A mixture of 3 grams of 5,5-diphenyl-hydantoin and 75 cc. of concentrated (37–38.5 percent) hydrochloric acid was autoclaved for 6 hours at 170–180° C. Undissolved material was filtered off and washed with water whereupon most of it went into solution. On mixing the washings and the original hydrochloric acid filtrate, 1.23 grams of α-amino-α,α-diphenylacetic acid hydrochloride crystallized. By dissolving the latter in 20 cc. of water and adding 1 cc. of pyridine, free α-amino-α,α-diphenylacetic acid was precipitated. The yield was 37 percent.

I claim:

The process which comprises hydrolyzing 5,5-diphenyl-hydantoin with an aqueous solution of sodium hydroxide at a temperature of about 170–180° C. under autogenous pressure in a closed vessel so as to produce α-amino-α,α-diphenylacetic acid.

ROBERT DUSCHINSKY.

REFERENCES CITED

The following references are of record in the file of this patent:

UNITED STATES PATENTS

| Number | Name | Date |
|---|---|---|
| 2,480,644 | Goldsmith et al. | Aug. 30, 1949 |
| 2,498,300 | Scott et al. | Feb. 21, 1950 |

FOREIGN PATENTS

| Number | Country | Date |
|---|---|---|
| 257,403 | Switzerland | Apr. 16, 1949 |

OTHER REFERENCES

Biltz: Ber Deut. Chem., vol. 41, pp. 1385–1386 (1908).

Biltz et al.: Chem. Abs., vol. 6, p. 3277 (1912).

Kozelka et al.: Chem. Abs., vol. 37, col. 2460 (1943).

Block: Chem. Reviews, vol. 38, p. 527 (1946).